United States Patent [19]
Yonemitsu et al.

[11] 3,887,646
[45] June 3, 1975

[54] RESINOUS COMPOSITIONS CONTAINING POLYPHENYLENE ETHER, STYRENE RUBBER AND RUBBER-MODIFIED CHLOROSTYRENE POLYMER

[75] Inventors: Eiichi Yonemitsu, Kashiwa; Akitoshi Sugio, Tokyo; Masanobu Masu, Tokyo; Masaharu Kimura, Tokyo; Seiichi Kamiyama, Tokyo, all of Japan

[73] Assignee: Mitsubishi Gas Chemical Company, Inc., Tokyo, Japan

[22] Filed: Oct. 30, 1972

[21] Appl. No.: 301,729

[30] Foreign Application Priority Data
Nov. 5, 1971   Japan................................ 46-87588

[52] U.S. Cl. ...... 260/876 R; 260/45.7 R; 260/45.85; 260/45.95; 260/873; 260/874; 260/876 B; 260/880; 260/890; 260/892; 260/894; 260/DIG. 24

[51] Int. Cl....................... C08f 15/00; C08f 19/00
[58] Field of Search................. 260/876 R, 880, 874

[56] References Cited
UNITED STATES PATENTS

| | | | |
|---|---|---|---|
| 3,285,997 | 11/1966 | Rubens | 260/880 R |
| 3,383,435 | 5/1968 | Cizek | 260/874 |
| 3,787,532 | 1/1974 | Carmelite et al. | 260/876 R |

*Primary Examiner*—John C. Bleutge
*Assistant Examiner*—Richard B. Turer
*Attorney, Agent, or Firm*—Wenderoth, Lind & Ponack

[57] ABSTRACT

A thermoplastic blended composition which possesses greatly superior flame retardancy, containing a polyphenylene ether, high styrene rubber and a rubber-modified chlorostyrene polymer in the respective ranges of 40–60 percent, 5–30 percent and 20–50 percent, by weight, the total of the three components amounting to 100 percent by weight.

6 Claims, No Drawings

RESINOUS COMPOSITIONS CONTAINING POLYPHENYLENE ETHER, STYRENE RUBBER AND RUBBER-MODIFIED CHLOROSTYRENE POLYMER

This invention relates to a new resinous composition which not only demonstrates excellent physical properties, particularly impact strength and resistance to fatigue as well as resistance to heat, but also possesses greatly superior inflammability. More specifically, the invention relates to such a resinous composition that has been obtained by mixing together a polyphenylene ether, high styrene rubber and a rubber-modified chlorostyrene polymer.

The polyphenylene ether is known to be a thermoplastic resin which excels in such mechanical properties as tensile strength and such electrical properties as volume resistivity, dielectric constant and dielectric strength and, in addition, possesses a high heat distortion temperature. However, it is said to possess such shortcomings as being poor in its moldability and workability as well as being inferior in its resistance to oxidation with heat. To improve on these shortcomings, the admixing of a polystyrene with the polyphenylene ether has been taught (see U.S. Pat. Nos. 3,384,682 and 3,383,435). In addition, for modifying the polyphenylene ether, resinous compositions in which have been incorporated polyamides (U.S. Pat. No. 3,379,792) and polyolefins (U.S. Pat. No. 3,361,851) have also been proposed. While in the case of these resinous compositions there is noted an improvement in the moldability of the polyphenylene ether in all cases, there is, on the other hand, a decline in the heat distortion temperature intrinsically possessed by the polyphenylene ether. Further, the properties such as impact strength or resistance to fatigue are not improved or, at times, are even degraded. Hence, as a practical matter, it can be said that the method of obtaining a resinous composition that satisfies the various properties required from the standpoint of its practical use by the admixture of various resins with polyphenylene ether has not necessarily been established as yet. As the mixed type resin that has been put to practical use on a commercial scale at the present time, there is the combination of the polyphenylene ether and the polystyrene, wherein impact resistant polystyrene is usually used as the polystyrene.

While the resinous composition such as above described can be obtained by merely mixing the constituent resins intimately with a mixer, there are cases where it is difficult to obtain a homogeneous mixture by a mechanical mixing procedure because of the poor compatibility of the constituent resins depending upon the combination of the constituent resins used. In order to overcome this difficulty, other improved methods of mixing the constituent resins have also been proposed. For instance, the method disclosed in Japanese patent publication No. 27809/71 is that of obtaining a modified resin by conducting the bulk polymerization of styrene in the presence of a rubbery substance and completing the polymerization reaction while adding polyphenylene ether during the polymerization step. It is claimed that by this method it is possible to achieve a homogeneous mixture, that is not obtainable by the method of mixing the impact resistant polystyrene and the polyphenylene ether with a mixer, and that the resin obtained is one which excels in mechanical properties, e.g. impact strength, and the molded product thereof excels in its appearance. Again, in Japanese patent publication No. 1791/71, there is disclosed a method of obtaining a resinous composition consisting of the polyphenylene ether and rubber, which comprises polymerizing a monomeric phenol in a reaction medium containing solvated rubber and thereafter coprecipitating the polymer by the addition of a poor solvent for the polymeric component. It is claimed that, as compared with the conventional method of mixing the impact resistant polystyrene and the polyphenylene ether with a mixer, it is possible to obtain a rubber-modified polyphenylene ether whose content of the rubber component is high and moreover in which the rubber component is homogeneously dispersed in the composition, with the consequence that the impact strength and the moldability of the composition are improved. While it is possible in accordance with this method to obtain a composition in which the impact strength and elongation are improved when compared with the composition obtained by mechanically mixing the constituent resins, the desirable properties intrinsically possessed by the polyphenylene ether become lost. In addition, not only the manufacturing process becomes complicated, but also in polymerizing a monomer in the presence of a polymer of a different class, it is not necessarily an easy matter to adjust the molecular weight, and moreover difficulties are experienced in obtaining readily and at will the desired composition. Hence, this method is not a practical method.

It is therefore an object of the present invention to provide a thermoplastic blended resinous composition which can be readily obtained by mechanically mixing the constituent resins.

Another object of the invention is to provide a thermoplastic blended composition which has improved moldability while maintaining the height of heat distortion temperature brought about by the polyphenylene ether to an extent suitable for practical use.

Another object of the invention is to provide a polyphenylene ether-containing thermoplastic blended resinous composition having self-extinguishing property and improved resistance to fatigue.

The foregoing objects of the present invention are attained by a thermoplastic blended composition according to the invention comprising a. a polyphenylene ether having the recurring units of the formula

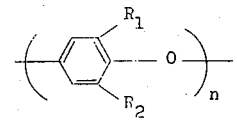

wherein $R_1$ and $R_2$, which may be the same or different, are either methyl or ethyl, and $n$ is an integer representing the degree of polymerization, b. high styrene rubber composed of units derived from styrene and units derived from a conjugated diene compound, and in which the units derived from styrene are contained in an amount of 40 to 60 percent by weight, and c. a rubber-modified chlorostyrene polymer composed of units derived from a conjugated diene compound and units derived from chlorostyrene, and in which the units derived from the conjugated diene compound are contained in an amount of 2 to 15 percent by weight;

wherein the foregoing components (a), (b) and (c) are contained in the compositions in the respective ranges of 40 to 60 percent, 5 to 30 percent and 20 to 50 percent, by weight, and such that the total thereof amounts to 100 percent by weight.

As previously noted, the generally practiced, simplest method of improving the properties of resins is that of merely mixing another class of resin with the resin whose improvement is contemplated. However, in mixing resins of different classes, the matter of compatibility between the resins must be considered. Especially, when the mixing is to be carried out mechanically, it frequently happens that, depending upon the class of the resins, the ratio of the resins and the mixing temperature, there results a blend of no practical use with a loss of the properties intrinsically possessed by the individual resins. This is especially true in the case of a blended composition of three or more classes of resins, for it is exceedingly difficult to predict in advance what the properties of the resulting composition will be.

With a view to obtaining a thermoplastic resinous composition having self-extinguishing properties, improved workability and resistance to fatigue while retaining the good properties possessed by the polyphenylene ether, we have engaged in extensive researches concerning the ternary resinous blends. In consequence of having tested and evaluated the compatibility, moldability and the properties of the resulting molded products, we found that when the ternary composition consisting of the polyphenylene ether, high styrene rubber and a rubber-modified chlorostyrene polymer was mixed in a specific ratio, an excellently moldable thermoplastic blended resinous composition could be obtained and that the so obtained composition possesses numerous excellent properties, inter alia a high heat distortion temperature and excellent impact strength and resistance to fatigue, as well as that it readily meets the standards of self-extinguishing properties corresponding to the level of the SE-1 in the UL-Subject-94 Standards, the combustion test standard in the United States.

As hereinbefore noted, in the case of the impact resistant polystyrene-modified polyphenylene ether presently used, while the impact strength and the moldability are improved, there is a decline in the heat distortion temperature, and the desirable properties intrinsically possessed by the polyphenylene ether are lost. In addition, unless a flame retardant is added, it is combustible. Only by adding a large quantity of a flame retardant is it modified to an extent as to meet the level of SE-1. But in this case the degradation of the other properties cannot be avoided. This is also true in the case of the prior composition wherein the polyphenylene ether is modified with rubber.

It is therefore indeed surprising that the ternary blend of a polyphenylene ether, high styrene rubber and a rubber-modified chlorostyrene polymer in a specific ratio provides a thermoplastic blended composition which, while maintaining its heat distortion temperature to an extent high enough for practical purposes, excels in impact strength and resistance to fatigue as well as possessing inflammability and good workability.

The polyphenylene ether used in the present invention is a polymer having the recurring structural units of the following formula

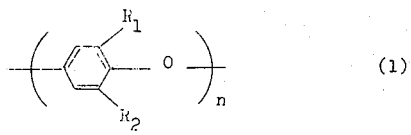

wherein $R_1$ and $R_2$, which may be the same or different, are either methyl or ethyl, and $n$ is a positive integer of at least 50. As typical examples, included are poly(2,6-dimethyl-1,4-phenylene)ether, poly(2-methyl-6-ethyl-1,4-phenylene)ether, and poly(2,6-diethyl-1,4-phenylene)ether. These polymers are obtained by the methods of preparation that are disclosed in, for example, U.S. Pat. Nos. 3,306,874, 3,306,875, 3,257,357 and 3,257,358.

The high styrene rubber denotes a rubbery polymeric substance containing units derived from styrene or a derivative thereof in an amount of 40 to 60 percent by weight and the remainder being units derived from a conjugated diene compound. As the rubber component derived from the conjugated diene compounds, mention can be made of the polymers composed of polymeric constituent units derived from such conjugated diene compounds as butadiene, isoprene and chloroprene or the copolymers containing the polymeric constituent units derived from these conjugated diene compounds. This high styrene rubber can be obtained by mechanically mixing a rubber component such as polybutadiene with polystyrene, or it can be obtained by the bulk polymerization of styrene in the presence of a rubber component or likewise by the solution polymerization with the addition of a solvent. Again, the copolymers of the conjugated diene monomers or the monomeric mixtures containing these and styrene can also be used. The so obtained high styrene rubber is a rubbery substance containing a rubber component amounting to 40 to 60 percent by weight and is a material which cannot be used by itself as a molding material. In contrast, the impact resistant polystyrene that has been used heretofore in the modification of polyphenylene ether contains the rubber component only in an amount of less than 10 percent by weight, and hence the high styrene rubber of the present invention is a substance which differs from that of the aforesaid impact resistant polystyrene.

The rubber-modified chlorostyrene polymer, the third resinous component making up the resinous composition, is a polychlorostyrene resin which contains as the rubber component 2 to 15 percent by weight of a polymer having the polymeric constituent units derived from such conjugated diene compounds as butadiene, isoprene and chloroprene and is a substance that may be considered as an impact resistant polychlorostyrene. The foregoing rubber-modified chlorostyrene polymer denotes either a resinous composition obtained by mechanically blending a rubber component, say polybutadiene, with a polymer of a chlorostyrene monomer of the formula

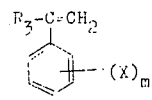

wherein $R_3$ is either hydrogen or a lower alkyl group, X is halogen, and $m$ is an integer of 1 or 2; or a resin obtained by polymerizing the aforesaid chlorostyrene monomer by any of the polymerization methods, such as the bulk, emulsion, solution or suspension polymerization method, in the presence of the foregoing rubber component. Further, the foregoing rubber component also comprehends the rubbery material containing the copolymeric units derived from the conjugated diene compounds and the vinyl monomers. The chlorostyrene monomer used for introducing the chlorostyrene units to the foregoing rubber-modified chlorostyrene polymer may be a mixture wherein not more than 50 percent by weight thereof has been substituted by such other styrene monomers as, for example, styrene, alpha-methylstyrene and vinyltoluene.

The ratio in which the foregoing three components of the polyphenylene ether, high styrene rubber and the rubber-modified chlorostyrene polymer are combined in making up the resinous composition of the invention is chosen from the ranges indicated below in consideration of the interrelationship of the compatibility of the three components and the properties that are mainfested by the resulting compositions. That is to say, in the present invention the proportion in which the three components are used are suitably chosen from the following ranges: 40 to 60 percent by weight of the polyphenylene ether, 5 to 30 percent by weight of the high styrene rubber and 20 to 50 percent by weight of the rubber-modified chlorostyrene polymer. These ranges are critical. For instance, if the amount of the polyphenylene ether used is less than 40 percent by weight, a decline takes place in the heat distortion temperature and tensile strength. On the other hand, if the amount of polyphenylene ether exceeds 60 percent by weight, the moldability suffers. The high styrene rubber is believed to contribute to providing, say, impact strength to the composition, but when the amount of high styrene rubber deviates from the foregoing range, there is generally a decline in the mechanical strength. Especially, when the amount of high styrene rubber exceeds 30 percent, a drop in the heat distortion temperature takes place to impair the characteristic of the composition. The rubber-modified chlorostyrene polymer plays a very important role in the composition as the component which contributes to the enhancement of the heat distortion temperature and to rendering the composition inflammable. When there is a deviation from the foregoing range, and the amount of this component is less than 20 percent by weight, not only the inflammability becomes poor, but the moldability also suffers. On the other hand, when the amount of the rubber-modified chlorostyrene polymer exceeds 50 percent by weight, not only the impact strength declines but the heat distortion temperature suffers as well. So long as the mix ratio is maintained within the foregoing ranges, there is no trouble, but if the foregoing ranges are violated, the appearance of the resulting shaped article may suffer on account of the poor compatibility of the components.

The resinous composition of this invention can be used as obtained as a molding material for injection molding or other molding methods. However, the general-purpose thermoplastic resins such as the aromatic polycarbonates, aromatic polyesters, and aromatic polyamides can be added in an amount not exceeding 5 percent by weight of said composition, if necessary. The addition of these resins do not impair the various properties of the invention composition.

Further, the resinous composition itself possesses excellent inflammability in that it qualifies for the level of SE-1 of the UL-Subject94 Standards, as previously indicated. However, by the addition of a flame retardant in an amount of less than 10 parts by weight, and preferably 0.5 to 7 parts by weight, per 100 parts of the composition, very outstanding inflammability is demonstrated, and a self-extinguishing resinous composition which qualifies for the level of SE-0 in the UL-Subject-94 Standards can be provided. As such flame retardants, mention can be made of the aromatic bromium compounds as exemplified by decabromobiphenyl, pentabromophenyl, pentabromotoluene, hexabromobenzene, decabromodiphenylcarbonate and tetrabromophthalic anhydride. The properties of the composition are not impaired in any way whatsoever by the addition of these flame retardants. Since there is not known as yet a practical resinous composition which has a flame retardancy which qualifies for the level of SE-0 in the UL-Subject-94 Standards, the self-extinguishing resinous composition of the present invention is exceedingly valuable.

The invention composition can also be incorporated, as required, with the various additives that have been commonly used in the past, included being the stabilizers such as the alkyl phenolic compounds, mercaptan type compounds, organic disulfide type compounds and phosphorous acid ester type compounds; the organic and inorganic pigments; the flame retardants other than those mentioned above such as phosphoric acid esters and halogenated compounds or the mixtures of these with the antimony compounds; the plasticizers of the phosphate and phthalate types; the ultraviolet absorbants; lubricants and fillers.

As fully described hereinabove, the present invention concerns a new resinous composition consisting of the three components of the polyphenylene ether, high styrene rubber and the rubber-modified chlorostyrene polymer, which composition excels in the various physical properties, inter alia impact strength, resistance to fatigue and thermal resistance and moreover possesses outstanding inflammability. In mixing the foregoing three components, the procedures employed include any of those of mixing and kneading the powders or pellets of the several components or pellets and powders thereof, using, for example, an extruder, a roller or other blenders.

The following examples will now be given to illustrate the features of the invention. The parts and percentages in the examples are on a weight basis unless otherwise indicated. The physical properties were measured by the following test methods.

Heat distortion temperature

The measurements were made in accordance with the ASTM Method D 648.

Tensile strength

The measurements were made in accordance with the ASTM Method D 638-68, using the Autograph IS-5000 manufactured by Shimazu Seisakusho, Japan.

Elongation

The elongation was measured in accordance with the ASTM Method D 638-68.

Impact strength

The measurement of impact strength was made in accordance with the ASTM Method D 286 by the notched Izod method.

Repeated fatigue test

Using a universal fatigue tester (UF-IS type, Shimazu Seisakusho), a test piece (S-type) described in ASTM D 1822-68 was subjected repeatedly to the reciprocal state of tension and compression at a speed of 1800 times per minute under a specific load, and the number of cycles required to cause breakage of the test piece was measured.

The fatigue limit, represented as a value of the maximum load under which the test piece is not broken even after 1.0 million cycles, was measured in accordance with the testing method identical to that described above according to the ASTM D-1822-68.

EXAMPLE I

Fifty parts of poly(2,6-dimethyl-1,4-phenylene) ether having an inherent viscosity [$\eta$] dl/g, as measured in chloroform at 25°C., of 0.50, 20 parts of high styrene rubber [a blend of polybutadiene and GP polystyrene in weight ratio of 4:6], 30 parts of a rubber-modified chlorostyrene polymer containing 4 percent of polybutadiene (obtained by the bulk polymerization of chlorostyrene in the presence of polybutadiene), 0.5 part of 2-mercaptobenzothiazole zinc salt, 5 parts of decabromobiphenyl and 1.0 part of titanium dioxide were mixed in a blender. The mixture was then pelletized with a biaxial extruder and thereafter molded into test pieces with an injection molder. The physical properties of the test pieces were as follows: tensile strenght 640 kg/cm$^2$, elongation 25.9 percent, flexural strength 919 kg/cm$^2$, modulus of elasticity in flexure 24.2×10$^3$ kg/cm$^2$, Izod impact strength (notched) 18.5 kg-cm/cm, tensile impact strength 140 kg-cm/cm$^2$, heat distortion temperature (18.6 kg/cm$^2$ load, after being annealed) 149.5°C. In a repeated fatigue test, the test piece broke after 2.5 million cycles. Further, in the combustion test in accordance with the UL-Subject-94 Standards, the test piece possessed self-extinguishing properties corresponding to the level of SE-0.

On the other hand, the commercially available polyphenylene ether modified by impact resistant polystyrene (trade name: NORYL SE-1, manufactured by General Electric Company) demonstrated a tensile strength of 630 kg/cm$^2$, elongation of 20 percent, flexural strength of 950 kg/cm$^2$, modulus of elasticity in flexure of 25×10$^3$ kg/cm$^2$, Izod impact strength (notched) of 11.1 kg-cm/cm, tensile impact strength of 129 kg-cm/cm$^2$ and heat distortion temperature (18.6 kg/cm$^2$ load, after being annealed) of 130°C., while in the repeated fatigue test, the test piece broke after 130,000 cycles. And, in the combustion test in accordance with the UL-Subject-94 Standards, the showing corresponded to the level of SE-1.

EXAMPLE II

Test pieces were obtained by using the same recipe as that of Example I, except that an isoprene-styrene copolymer rubber containing 40 percent of the units derived from styrene was used as high styrene rubber. The molded product had the following physical properties: tensile strenght 630 kg/cm$^2$, elongation 30 percent, Izod impact strength (notched) 15 kg-cm/cm, heat distortion temperature (18.6 kg/cm$^2$ load, not annealed) 130°C. and in the repeated fatigue test as conducted in Example I the fatigue limit was 200 kg/cm$^2$. In the combustion test according to the UL-Subject-94 Standards, the performance was found to correspond to the level of SE-0.

EXAMPLE III

To resinous components consisting of 50 parts of poly(2,6-dimethyl-1,4-phenylene)ether, 17 parts of high styrene rubber obtained by mixing polybutadiene and polystyrene in a weight ratio of 45:55 followed by thorough mixing and kneading in a Banbury mixer, and 33 parts of a rubber-modified chlorostyrene polymer containing 4.5 percent of polybutadiene, obtained by polymerizing a mixture of monochlorostyrene and styrene (chlorostyrene content: 75 percent) by the emulsion polymerization in the presence of polybutadiene, were admixed 0.5 part of mercaptobenzothiazole zinc salt, 5 parts of pentabromotoluene and 1.0 part of titanium dioxide, using a blender. The mixture was then pelletized with a biaxial extruder and so-obtained pellets were extruded at 300°C. and 1350 kg/cm$^2$ with an injection molder to prepare the test pieces. The physical properties of these test pieces were as follows: tensile strength 650 kg/cm$^2$, elongation 30 percent, flexural strength 1020 kg/cm$^2$, modulus of elasticity in flexure 25×10$^3$ kg/cm$^2$, Izod impact strength (notched) 15.0 kg-cm/cm, tensile impact strength 150 kg-cm/cm$^2$ and heat distortion temperature (18.6 kg/cm$^2$ load, after being annealed) 150°C. Further, on conducting the same repeated fatigue test as that of Example I, a fatigue limit of 210 kg/cm$^2$ was demonstrated as compared with 125 kg/cm$^2$ for the commercially available NORYL SE-1. The level in the combustion test in accordance with the UL-Subject-94 Standards corresponded to SE-0.

EXAMPLE IV

The poly(2,6-dimethyl-1,4-phenylene)ether, high styrene rubber and the rubber-modified chlorostyrene polymer used in Example I were mixed in the amounts of 55, 10 and 35 parts, respectively, with 0.5 part of 2-mercaptobenzothiazole zinc salt and 1.0 part of titanium dioxide and thereafter pelletized and extruded as in Example III to obtain the test pieces. The physical properties of these 14 test pieces were as follows: tensile strength 700 kg/cm$^2$, elongation 40 percent, Izod impact strength (notched) 15.0 kg-cm/cm, heat distortion temperature (18.6 kg/cm$^2$ load, not annealed) 135°C. and fatigue limit 190 kg/cm$^2$. And, in the combustion test in accordance with the UL-Subject-94 Standards, a self-extinguishing property corresponding to the level of SE-1 was demonstrated.

EXAMPLE V

Example 1 was repeated except that the rubber-modified chlorostyrene polymer was used in an amount of 25 parts instead of 30 parts, and 5 parts of poly(2,2-diphenylpropane)carbonate was also used to obtain a resinous composition. The injection-molded product of this composition demonstrated the following physical properties: tensile strength 590 kg/cm$^2$, elongation 25 percent, flexural strength 899 kg/cm$^2$, modulus of elasticity in flexure 24.1×10$^3$ kg/cm$^2$, Izod impact strength (notched) 12.1 kg-cm/cm, tensile impact strength 120 kg-cm/cm$^2$, fatigue limit 195 kg/cm$^2$ and heat distortion temperature (18.6 kg/cm$^2$ load, after being annealed) 148°C. In the combustion test in accordance with the UL-Subject-94 Standards, the self-extinguishing level was SE-0.

EXAMPLE VI

Example I was repeated except that instead of using 20 parts of high styrene rubber and 30 parts of the rubber-modified chlorostyrene polymer these components were used in the amounts of 17.5 and 27.5 parts, respectively, and, in addition, 5 parts of TROGAMIDE T (the trade name of an aromatic polyamide resin produced by Dynamit Nobel AG.) was used. Further, 5 parts of pentabromophenol was used instead of 5 parts of decabromodiphenyl.

The injection-molded products prepared from the foregoing composition had the following physical properties: tensile strength 630 kg/cm$^2$, elongation 25 percent, flexural strength 930 kg/cm$^2$, modulus of elasticity in flexure 24.1×10$^3$ kg/cm$^2$, Izod impact strength (notched) 15 kg-cm/cm, tensile impact strength 130 kg-cm/cm$^2$, fatigue limit 200 kg/cm$^2$ and heat distortion temperature (18.6 kg/cm$^2$ load, after being annealed) 149°C. and in the combustion test in accordance with the UL-Subject-94 Standards, the self-extinguishing level of SE-0 was demonstrated.

The same example was repeated except that hexabromobenzene, decabromodiphenylcarbonate or tetrabromophthalic anhydride was used instead of pentabromophenol.

The injection-molded products prepared from each of the foregoing compositions had the same physical properties as above-mentioned. In the combustion test according to the UL-Subject-94 Standards, the performance was found to correspond to the level of SE-0.

On the other hand, the same example was repeated except that tris(2,3-dibromopropyl) phosphate was used as a flame retardant instead of pentabromophenol.

The injection-molded product demonstrated the inflammability corresponding to the level of SE-0 in the UL-Subject-94 Standards. But because of the thermal decomposition of tris(2,3-dibromopropyl)phosphate the product was found to be colored and degraded in physical properties and to be of no practical use.

EXAMPLE VII

Except that the poly(2,6-dimethyl-1,4-phenylene) ether and high styrene rubber were used in the amounts of 46 and 7 parts, respectively, and 47 parts of a rubber-modified chlorostyrene polymer, prepared by blending 8 percent of a isoprene-isobutylene copolymer rubber in polychlorostyrene with a mixer was admixed with the foregoing components, and pentabromotoluene was not used, otherwise the same recipe as that of Example III was used to obtain a resinous composition. Test pieces were then prepared from the so obtained composition by injection-molding. These test pieces had a tensile strength of 650 kg/cm$^2$, a fatigue limit of 180 kg/cm$^2$ and a heat distortion temperature (18.6 kg/cm$^2$ load, not annealed) of 130°C. The inflammability corresponded to the level of SE-1 in the UL-Subject-94 Standard.

EXAMPLE VIII

Forty-five parts of poly(2,6-dimethyl-1,4-phenylene) ether, 10 parts of high styrene rubber (consisting of a styrene-butadiene block copolymer and GP polystyrene in a ratio of 1.1:1.0, thoroughly mixed and kneaded in an extruder), 45 parts of a chlorostyrene-styrene (75:25) copolymer containing 6.0 percent of polybutadiene, 0.5 part of 2-mercaptobenzothiazole zinc salt, 4 parts of decabromodiphenyl, 1.0 part of antimony trioxide and 1.0 part of titanium dioxide were mixed in a blender, followed by pelleting with a biaxial extruder and thereafter molding with an injection molder to obtain test pieces whose physical properties were as follows: tensile strength 630 kg/cm$^2$, elongation 30 percent, flexural strength 1010 kg/cm$^2$, modulus of elasticity in flexure 25.0×10$^3$ kg/cm$^2$, Izod impact strength (notched) 19.0 kg-cm/cm, tensile impact strength 150 kg-cm/cm$^2$, heat distortion temperature (18.6 kg/cm$^2$ load, after being annealed) 150°C. Fatigue limit was 205 kg/cm$^2$. And, in the combustion test in accordance with the UL-Subject-94 Standards, a showing corresponding to the level of SE-0 was demonstrated.

EXAMPLE IX

The same recipe as that used in Example VIII was used, except that high styrene rubber obtained by graft-polymerizing a polybutadiene latex and styrene at a ratio of 4:6 in the emulsion state was used. The physical properties of the resulting molded product were as follows: tensile strength 640 kg/cm$^2$, elongation 25 %, flexural strength 1020 kg/cm$^2$, modulus of elasticity in flexure 25.5×10$^3$ kg/cm$^2$, Izod impact strength (notched) 15.0 kg-cm/cm, tensile impact strength 140 kg-cm/cm$^2$ and heat distortion temperature (18.6 kg/cm$^2$ load, after being annealed) 151.0°C. Further, fatigue limit was 200 kg/cm$^2$. And, in the combustion test in accordance with the UL-Subject-94 Standards, the inflammability demonstrated corresponded to the self-extinguishing properties of the level of SE-0.

EXAMPLE X

The same recipe as that used in Example I was used, except that 50 parts of poly(2,6-diethyl-1,4-phenylene) ether was used as the polyphenylene ether to obtain molded products having the following physical properties; tensile strength 635 kg/cm$^2$, elongation 30 %, flexural strength 900 kg/cm$^2$, modulus of elasticity in flexure 24.0×10$^3$ kg/cm$^2$, Izod impact strength (notched) 19.0 kg-cm/cm, tensile impact strength 150 kg-cm/cm$^2$ and heat distortion temperature (18.6 kg/cm$^2$ load, after being annealed) 145°C. Further, in the repeated fatigue test, breakage occured after 2.5 million cycles. On the other hand, when the combustion test in accordance with the UL-Subject-94 Standards was conducted, a showing corresponding to the level of SE-0 was demonstrated.

CONTROL I

Example I was repeated except that the polyphenylene ether, high styrene rubber and rubber-modified chlorostyrene polymer were used in the amounts of 70, 25 and 5 parts, respectively, to obtain a resinous composition. However, difficulties were experienced in molding this composition.

CONTROL II

The same recipe as that used in Example I was used, except that the polyphenylene ether, high styrene rubber and the rubber-modified chlorostyrene polymer were used in the amounts of 40, 40 and 20 parts, respectively, to obtain molded products. However, in the combustion test in accordance with the UL-Subject-94 Standards, the level of SE-0 was demonstrated only when a flame retardant was used in excess of 15 parts. Moreover, the various physical properties suffered when the flame retardant was used in excess of 15 parts.

What is claimed is:

1. A thermoplastic blended composition comprising
  a. a polyphenylene ether having recurring units of the formula

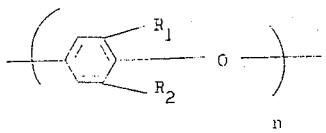

wherein $R_1$ and $R_2$, which may be the same or different, are each selected from the group consisting of methyl and ethyl and $n$ is an integer representing the degree of polymerization,
  b. high styrene rubber composed of units derived from styrene and units derived from at least one conjugated diene monomer selected from the group consisting of butadiene, isoprene and chloroprene, obtained by copolymerization of styrene and the conjugated diene monomer, and in which the units derived from styrene amount to 40 to 60 percent by weight, and
  c. a rubber-modified chlorostyrene polymer composed of units derived from at least one conjugated diene monomer selected from the group consisting of butadiene, isoprene and chloroprene and units derived from chlorostyrene, obtained by polymerization of a chlorostyrene monomer in the presence of a rubber component, and in which the units derived from the conjugated diene monomer amount to 2 15 percent by weight, the proportions of components (a), (b) and (c) being in the ranges of 40 to 60 percent, 5 to 30 percent and 20 to 50 percent, by weight, respectively.

2. A composition according to claim 1 wherein said component (c) is a rubber-modified chlorostyrene polymer composed of units derived from the conjugated diene monomer and units derived from a mixture containing more than 50 percent by weight of chlorostyrene, the remainder of the mixture being styrene or a derivative thereof.

3. A composition according to claim 1 further comprising at least one member selected from the group consisting of thermal stabilizers, plasticizers and flame retardants.

4. A composition according to claim 1 wherein said composition has an inflammability corresponding to, or exceeding, the level of SE-1 in the combustion test in accordance with the UL-Subject-94 Standards.

5. A composition according to claim 3 wherein said flame retardants are selected from the group consisting of decabromobiphenyl, pentabromophenol, pentabromotoluene, hexabromobenzene, decabromodiphenylcarbonate and tetrabromophthalic anhydride.

6. A composition according to claim 5 wherein said composition has an inflammability corresponding to the level of SE-0 in the combustion test in accordance with the UL-Subject-94 Standards.

* * * * *